000

United States Patent [19]

Sugikawa

[11] Patent Number: 5,655,295
[45] Date of Patent: Aug. 12, 1997

[54] LEAD-PROVIDED POROUS METAL SHEET AND METHOD FOR MANUFACTURING THE SHEET

[75] Inventor: Hirofumi Sugikawa, Toyonaka, Japan

[73] Assignee: Katayama Special Industries, Ltd., Osaka, Japan

[21] Appl. No.: 438,476

[22] Filed: May 10, 1995

Related U.S. Application Data

[62] Division of Ser. No. 352,613, Dec. 9, 1994, Pat. No. 5,508,114.

[30] Foreign Application Priority Data

Dec. 10, 1993 [JP] Japan ................................. 5-310748

[51] Int. Cl.⁶ ............................................. H01R 43/02
[52] U.S. Cl. ................................................ 29/879; 429/235
[58] Field of Search ............................. 29/2, 874, 875, 29/879, 880, 882; 428/548; 429/235–7, 241

[56] References Cited

U.S. PATENT DOCUMENTS

| | | | |
|---|---|---|---|
| 4,460,666 | 7/1984 | Dinkler et al. | 429/241 |
| 5,106,704 | 4/1992 | Takkanat et al. | 429/235 |
| 5,196,281 | 3/1993 | Pensabene et al. | 429/235 |
| 5,336,276 | 8/1994 | Pensabene et al. | 429/235 |

OTHER PUBLICATIONS

Patent Abstracts of Japan, No. JP58188058, Nov. 2, 1983; Saitou Takeshi; "Manufacture of Base Plate for Alkaline Storage Battery".
Patent Abstracts of Japan, No. JP63307665, Dec. 15, 1988; Yokota Kenji; "Manufacture of Electrode Plate for Alkali Storage Battery".
Patent Abstracts of Japan, No. JP59008272, Jan. 17 1984; Iwaki Tsutomu; "Manufacture of Electrode Substrate".

*Primary Examiner*—Larry I. Schwartz
*Assistant Examiner*—Adrian L. Coley
*Attorney, Agent, or Firm*—Sughrue, Mion, Zinn, Macpeak & Seas

[57] ABSTRACT

A method of manufacturing a lead-provided porous metal sheet comprises the steps of: forming a porous metal material having a metal layer on a surface of a framework of a porous base material comprising a foamed sheet and the like, by plating the porous base material and/or applying fine metal powders thereto; passing the porous metal material through a pair of rolls having a plurality of projections formed thereon to compress the porous metal material against the projections and reduce or eliminate pores so as to form one or more recesses extending; and forming solid metal portions by applying fine metal powders to the entire recesses.

28 Claims, 14 Drawing Sheets

LEAD-PROVIDED POROUS METAL SHEET AND METHOD FOR MANUFACTURING THE SHEET

This is a divisional of application Ser. No. 08/352,613 filed Dec. 9, 1994 now U.S. Pat. No. 5,508,114.

BACKGROUND OF THE INVENTION

1. Field of the Invention

The present invention relates to a lead-provided porous metal sheet and a method for manufacturing the same, and more particularly, to a lead-provided porous metal sheet preferably used as a spiral type electrode plate of a battery. In order to use, as a spiral type electrode plate, a porous metal sheet formed by using a combination of porous sheets such as a foamed sheet, a piece of nonwoven cloth, and a mesh sheet or only one of these three types of sheets, an active substance into pores of the porous metal sheet. In this manner, leads consisting of continuous solid metal serving as a collection element for collecting electric current is formed along the peripheral edge of the spiral type electrode.

2. Description of the Related Art

In the case of a cylindrical battery having the spiral type electrode plate, the porous metal sheet is used as the core of both positive and negative electrode plate. The band-shaped positive and negative electrode plates formed by charging the active substance into pores of the porous metal sheet are spirally wound, with a separator interposed therebetween.

In order for the battery having the spiral type electrode plate to collect electric current, and one end of a collection terminal is connected with a portion of the positive and negative electrode plates by spot welding, respectively and the other end of the collection terminal welded to the positive electrode plate is welded to a sealing portion, provided with a cap, serving as a positive terminal, and other end of the collection terminal welded to the negative electrode plate is welded to the inner bottom surface of the metal casing of the battery.

In the case where each collection terminal is connected with each electrode plate at one point thereof by spot welding, the distance between the point at which electric current has been generated in the electrode and each collection terminal is long and further, collected electric current flows only through one collection terminal. Consequently, the internal resistance of the battery is great.

Because the rigidity of the porous metal sheet becomes very high when the active substance is charged into pores thereof, there is a high possibility that the porous metal sheet is broken when it is wound spirally. If the lead is not broken, electric current can be collected effectively, while if the lead is broken, the porous metal sheet cannot function.

Thus, as shown in FIG. 13, a battery of multipoint collection type is proposed: A positive electrode plate 1 and a negative electrode plate 2 are spirally wound by varying the vertical position of the positive electrode plate 1 and that of the negative electrode 2 a little from each other, with a separator interposed therebetween; an upper edge portion of electrodes 1 and a lower edge portion of electrodes 2 are project respectively upward and downward from a core portion piled with electrodes 1 and 2; leads 4 and 5 made of solid metal are provided on the projected portion of the electrodes; collection terminals 6 and 7 made of metallic lath plate, a metallic net, or a metallic plate are placed on the leads 4 and 5, respectively, and the collection terminals 6 and 7 are welded to each of the leads 4 and 5. There is a case where the collection terminals 6 and 7 are connected with each of the leads 4 and 5 at one point thereof.

Methods shown in FIGS. 14A and 14B are known as the method for forming the electrode plates 1 and 2 having the leads 4 and 5 provided at one end thereof.

According to the method shown in FIG. 14A, initially, a porous metal sheet 10 is pressed in the widthwise direction thereof at regular intervals to form lead portions 10a having very small percentage of pores. Then, an active substance is charged into pores of the porous metal sheet 10. At this time, the active substance is not charged into the lead portions 10a because the lead portions 10a have very small percentage of pores. Then, the porous metal sheet 10 is slitted along the lead portions 10a in the lengthwise direction thereof. Then, the porous metal sheet 10 is cut in directions perpendicular to the lengthwise direction thereof to a length necessary to be used in a battery. Thereafter, a lead plate 10b made of a narrow band-shaped metal plate is welded to each of the lead portions 10a because the lead portions 10a are thin and hence does not have a high strength. In this manner, leads 4 and 5 are formed.

According to the method shown in FIG. 14B, first, lead plates 10b made of a narrow band-shaped metal plate are welded to the porous metal sheet 10 by spacing the lead plates 10b at regular intervals in the widthwise direction of the porous metal sheet 10 to form the leads 4 and 5. Then, an active substance is charged into pores of the porous metal sheet 10. At this time, the active substance is not charged into the leads 4 and 5 because the lead plates 10b have been welded to the porous metal sheet 10. Then, the porous metal sheet 10 is slitted and cut to form an electrode plate to be used in a battery.

In the above-described electrode plate, the narrow band-shaped metal plate 10b is welded to the porous metal sheet to form the leads thereon. The metal plate 10b is very thin and the width thereof is as small as 1.0 mm–5.0 mm. Thus, it is very difficult to weld the metal plate 10b to the porous metal sheet 10 and further, welding positions are frequently dislocated from predetermined welding positions.

In order to overcome the above-described disadvantage, the present applicant proposed the electrode plate having leads (disclosed in Japanese Laid-Open Patent Publication No. 3-241662). The electrode plate is made of a porous metal sheet formed by plating a combination of three-dimensional net-shaped porous sheets such as a foamed sheet, a piece of nonwoven cloth, and a porous mesh sheet layered one on the other or only one of the above three types of porous sheets which can be allowed to have porosity at more than 90%.

According to the method for forming leads on the three-dimensional net-shaped porous metal sheet, a lead-forming sheet is overlaid on the surface of a combination of porous sheets such as the foamed sheet, the nonwoven cloth, and the mesh sheet layered one on the other or only one of them, and then, plating is performed. As a result, the leads consisting of solid metal are continuously formed.

The above-described three-dimensional net-shaped porous metal sheet has porosity at more than 90% and eliminates the process of welding the metal plate forming a lead to the porous metal sheet. But it is necessary to layer the lead-forming sheet on the base sheet in plating the base sheet. Thus, it takes much time and labor to mount lead-forming sheet on the base sheet.

In addition, it is necessary to prepare a lead-forming sheet consisting of a metal foil sheet or a resin sheet having tape-shaped lead-forming portions continuously formed at regular intervals and the porous portions interposed between the lead-forming portions; a metal foil tape; a water-soluble film having the lead-forming portions printed with coating material, resin or metal powders; a lead-forming sheet having fine meshes in lead-forming portions and having a porosity at 40–90%, provided in portions between the lead-forming portions. Thus, the cost for manufacturing the lead forming sheet is high and takes much time and labor.

Further, in order to form the lead by plating, a masking sheet on which metal is not deposited is adhered to portions of the surface of the porous metal sheet formed by a primary plating except for the lead-forming portions thereof, when the lead is formed by plating. In addition, another masking sheet is required in forming a wide lead by a secondary plating. Thus, it takes much time and labor to install the masking sheet on the porous metal material and remove it therefrom.

Furthermore, it is necessary to provide another lead-forming sheet in altering the width of the lead or the interval between the leads.

SUMMARY OF THE INVENTION

The present invention has been developed with a view to substantially solving the above described disadvantages and has for its essential object to provide an improved porous metal sheet having leads, consisting of solid metal, which can be formed very easily in forming the porous metal sheet from a three-dimensional net-shaped base material and a method for manufacturing the lead-provided porous metal sheet.

In order to achieve the aforementioned object, a method of manufacturing a lead-provided porous metal sheet comprises the steps of:

forming a porous metal sheet having a metal layer formed on a surface of a framework of a porous base material comprising a foamed sheet, a piece of nonwoven cloth or a mesh sheet or a combination of two or more of the foamed sheet, the nonwoven cloth, and the mesh sheet layered one on the other, by plating the porous base material and/or applying fine metal powders thereto;

passing the porous metal sheet through a pair of rolls having a plurality of projections formed thereon to compress the porous metal sheet against the projections and reduce or eliminate pores so as to form one or more recesses extending continuously in the lengthwise direction of the porous metal sheet by spacing the recesses at regular intervals in the widthwise direction thereof; and forming solid metal portions by applying fine metal powders to the entire recesses;

whereby at least one lead made of the solid metal is formed thereon continuously in a predetermined width on the porous metal sheet.

When the porous metal sheet having a thickness of 1.6 mm and a porosity of 95% is passed through a pair of rolls having projections to reduce the thickness thereof to 0.08 mm at the recess, the porosity of the recess becomes 0%. When the thickness of the porous metal sheet is reduced to 0.2 mm, the porosity of the recess is reduced to 60%. Thus, when fine metal powders are applied to the recess, solid metal having no pores can be formed.

A pair of rolls having the projections are disposed on upper and lower sides of the base sheet to form recesses on the upper and lower surfaces thereof. Then, fine metal powders are applied to the recesses, and then, pressed by the upper and lower projections of the rolls so as to form the solid metal portions on the upper and lower surfaces of the base sheet. Needless to say, the solid metal portions may be formed on one of the upper and lower surfaces of the base sheet.

In another aspect of the present invention, a method of manufacturing a lead-provided porous metal sheet comprises the steps of:

forming the porous metal sheet having a metal layer on a surface of a framework thereof a porous base material comprising a foamed sheet, a piece of nonwoven cloth or a mesh sheet or a combination of two or more of the foamed sheet, the nonwoven cloth, and the mesh sheet layered one on the other, by plating the porous base material and/or applying fine metal powders thereto;

applying fine metal powders linearly continuously in a stripe configuration to the porous metal sheet;

passing the porous metal sheet through a pair of rolls having a plurality of projections formed thereon to compress the entire fine metal powders applied thereto in a stripe configuration against the projections to form solid metal portions, whereby at least one lead made of solid metal is formed thereon continuously in a predetermined width on the porous metal sheet.

In this method, in forming solid metal portions, preferably, fine metal powders are applied to the upper and lower surface of the porous metal sheet linearly, and then, pressed by the upper and lower projections of a pair of upper and lower rolls so as to form the solid metal portions on the upper and lower surfaces of the porous metal sheet.

After the lead made of the solid metal is formed, the porous base material made of resin and the like is baked to remove from the metal portions and then, metal portions are sintered.

Fine metal powders to be applied to the entire recesses or portions to be formed as the leads are mixed with binder to form slurry. The slurry is applied to the surface of the metal porous sheet by rotary screen method, roll coating method, and doctor coating method.

The following metals are used as the fine metal powders: Ni, Fe, Ag, Cu, Zn, and Fe—Cr alloy. Acrylic resin, epoxy resin, and phenol resin are preferably used as the binder.

It is preferable to set the viscosity of the slurry to 500–25000 cps.

The amount of the slurry to be applied to the porous base material is in the range from 300 to 1500 g/m². The width of each lead is in the range from 2.0 to 20.0 mm. The thickness of each lead is in the range from 0.02 mm to 0.3 mm which is smaller than the thickness of the metal porous sheet.

The solid metal portions are formed continuously on the metal-provided porous sheet in the lengthwise direction thereof by spacing them at predetermined intervals in the widthwise direction thereof. The metal-provided porous sheet is slitted along the solid metal portions in the lengthwise direction thereof. In a result, a plurality of the metal porous sheet having a lead disposed at least one edge in the width wise direction thereof are obtained.

In another aspect of the present invention, the lead-provided porous metal sheet manufactured by the above-mentioned method is proposed. That is, the lead-provided porous metal sheet of the present invention comprises of the framework of the porous base sheet which is constituted of a conductive metal layer formed by electroplating or fine metal powders and leads which are made of solid metal consisting of fine metal powders and formed in a predetermined width in the lengthwise direction of the metal-provided porous sheet.

The leads made of the solid metal portions are formed continuously on the upper and lower surfaces of the porous metal sheet extend in the lengthwise direction thereof with predetermined intervals provided between them in the widthwise direction thereof. The porous metal sheet is slitted along each lead in the lengthwise direction thereof, and cut to predetermined lengths in directions perpendicular to the lengthwise direction. Then, a plurality of the metal porous sheet having a lead on at least one edge thereof are obtained by slitting and cutting. The lead-provided porous metal sheet is coiled, the lead is disposed along one edge in the widthwise direction thereof.

An active substance is charged into pores of the porous metal sheet except the leads, and then, the porous metal sheet is cut to provide the lead-provided porous metal sheet as a strip to be used as a spiral type electrode plate.

According to the present invention, a porous base material such as a foamed sheet, a mesh sheet or a piece of nonwoven cloth is used to form the metal porous sheet. While the porous base material is being processed into a porous metal sheet or at the last stage of the process, the porous base material is pressed by a pair of upper and lower rolls having projections formed thereon so as to define recesses thereon having pores on the surfaces thereof at a very small percentage. Then, fine metal powders are applied to the recesses. In this manner, leads consisting of solid metal can be manufactured very easily.

According to another method, after fine metal powders are applied linearly on the porous base material, portions to which the fine metal powders have been applied are pressed by the projections of the rolls. In this manner, leads made of solid metal consisting of dense fine metal powders can be easily formed.

As such, the present invention eliminates the need for the provision of the lead-forming sheet required in the conventional method.

In adjusting the position of the lead or the width thereof depending on the type of a battery, it is only necessary to adjust the vertical positions of the projections of the rolls and positions to which the fine metal powders are applied linearly.

Further, because the leads consisting of solid metal are integral with the porous metal sheet, the porous metal sheet is allowed to have a high strength.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1A:
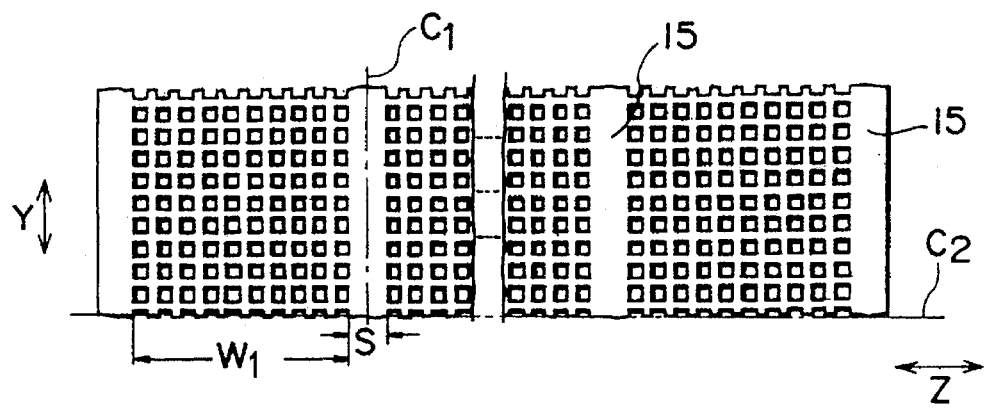
FIG. 1A is a plan view showing a lead-provided porous metal sheet according to the present invention.

Before the description of the present invention proceeds, it is to be noted that like parts are designated by like reference numerals throughout the accompanying drawings.

A lead-provided porous metal sheet according to a first embodiment of the present invention is described below with reference to FIGS. 1 through 8.

Figure 1B:
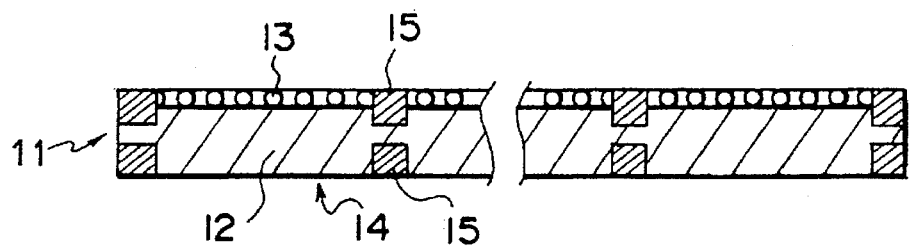
FIG. 1B is a sectional view showing the lead-provided porous metal sheet shown in FIG. 1A.

FIG. 1 shows a lead-provided porous metal sheet according to the first embodiment of the present invention. The lead-provided porous metal sheet 11 comprises a porous metal portion 14 comprising a metal foamed sheet 12 and a metal mesh sheet 13 overlaid entirely on one side of the metal foamed sheet 12; and a plurality of leads 15, composed of solid metal, extending continuously in the lengthwise direction of the lead-provided porous metal sheet 11 and spaced at regular intervals in the widthwise direction X thereof.

The case in which the lead-provided porous metal sheet 11 is used as the material of a spiral type electrode plate is described below, before the method for manufacturing the lead-provided porous metal sheet 11 is described.

First, an active substance is charged into porous metal portion 14 of the lead-provided porous metal sheet 11 while it is continuously supplied. The porous metal portion 14 are formed on the metal foamed sheet 12 and metal mesh sheet 13 overlaid on the metal foamed sheet 12 and a percentage of porosity is approximately 95. Thus, during the charging operation, the active material is charged into the pores of the metal foamed sheet 12 and the metal mesh sheet 13, whereas it is not charged into the lead 15 because the lead 15 does not have pores formed thereon.

Figure 2:
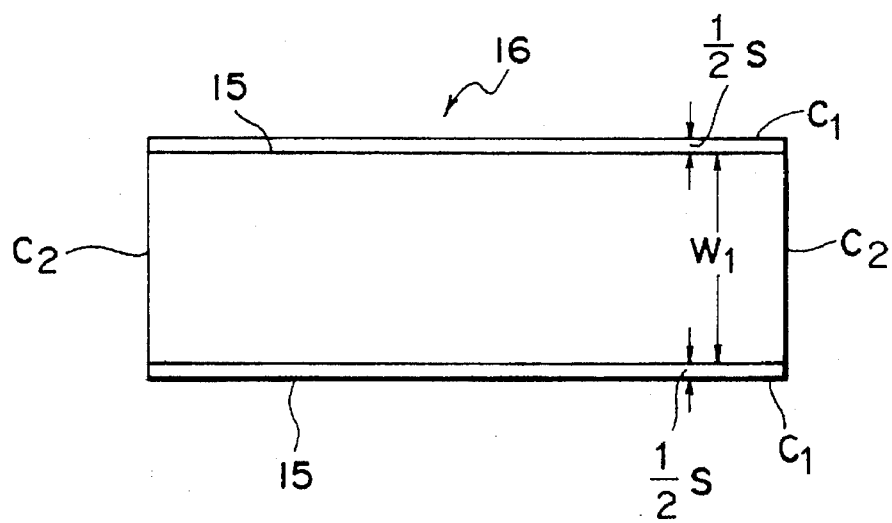
FIG. 2 is a schematic view showing a strip formed by cutting the lead-provided porous metal sheet shown in FIG. 1A to a plurality of strips.

The lead-provided porous metal sheet 11 into which the active material has been charged is cut in the lengthwise direction Y of the lead-provided porous metal sheet 11 along a one-dot chain line $C_1$ connecting the center of each lead 15 in the widthwise direction of the lead 15. Then, the lead-provided porous metal sheet 11 is cut along one-dot chain line $C_2$ extending in the direction Z perpendicular to the lengthwise direction Y of the lead-provided porous metal sheet 11. Consequently, an electrode plate 16 consisting of a strip obtained by cutting the lead-provided porous metal sheet 11 is prepared, as shown in FIG. 2.

In the electrode plate 16, the sum of the width W1 of the porous metal portion 14 and ½×S of the width W2 of the lead 15 is set to be equal to the height of the electrode plate 16, and the lead 15 is disposed at the upper and lower ends of the electrode plate 16 in the vertical direction thereof.

Figure 13:
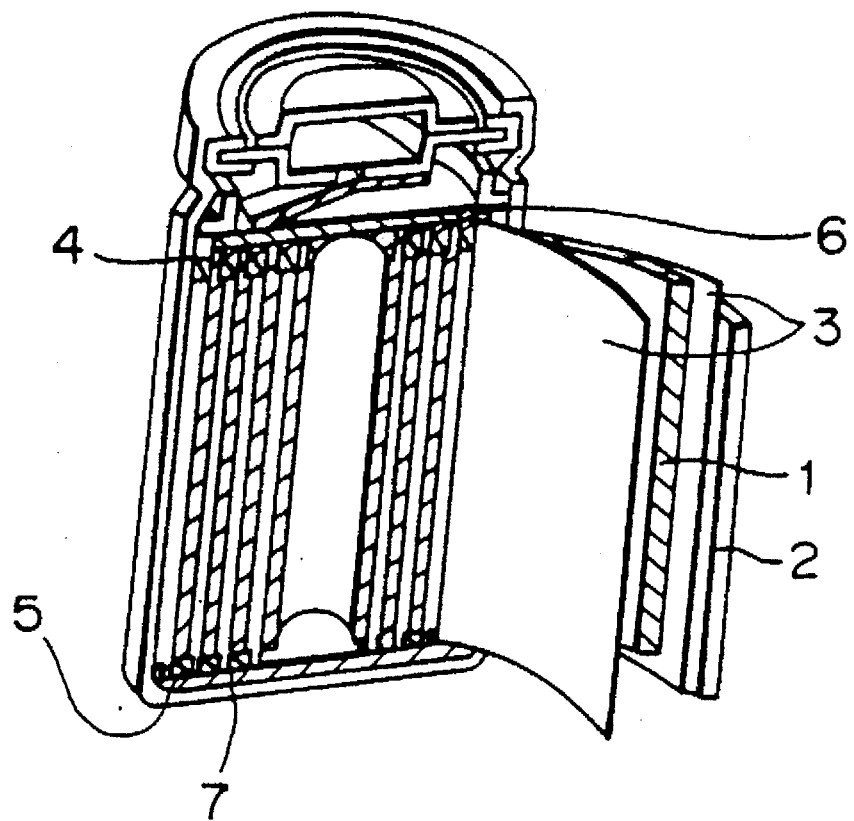
FIG. 13 is a perspective view showing a collection mechanism of a spiral type electrode plate.
Figure 14A:
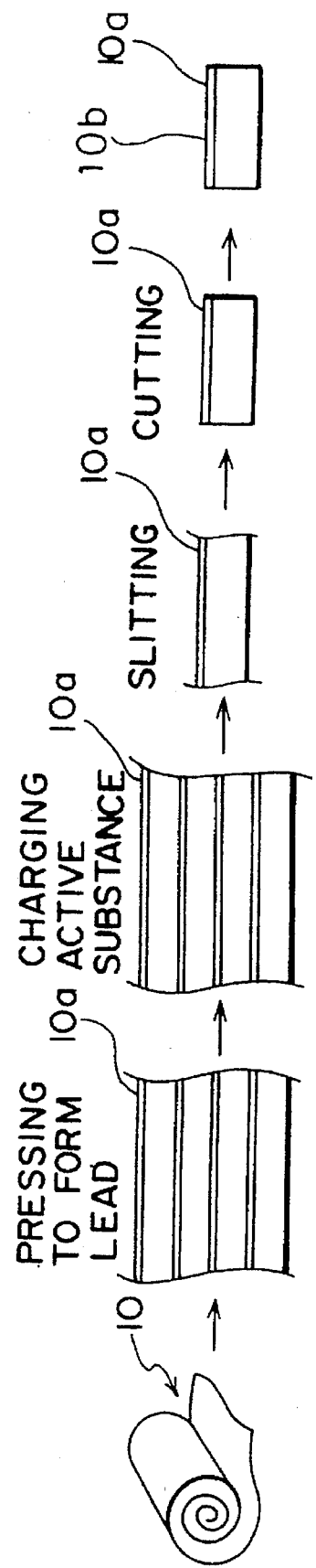
FIG. 14A is a schematic view showing a conventional method for manufacturing a lead-provided porous metal sheet.
Figure 14B:
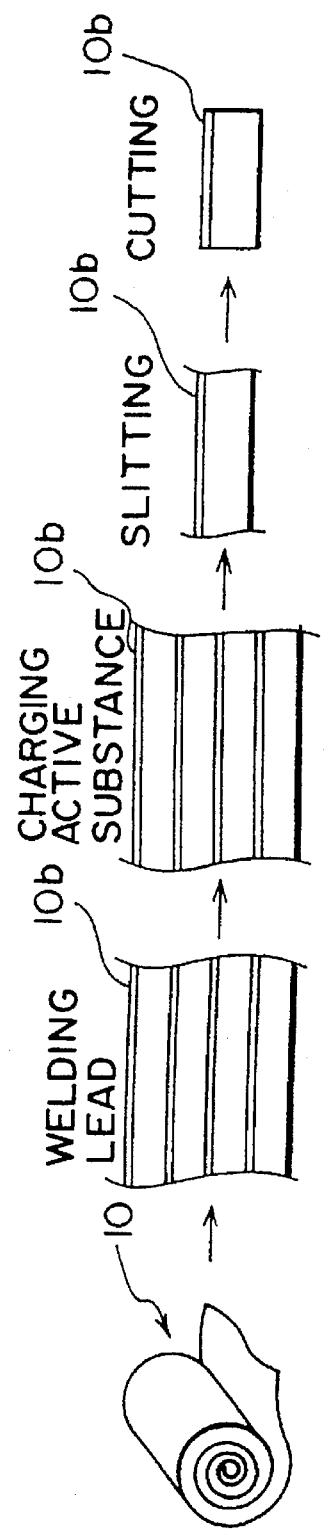
FIG. 14B is a schematic view showing another conventional method for manufacturing a lead-provided porous metal sheet.

In using the electrode plate 16 as positive and negative electrode plates of the spiral type electrode, the positive and negative electrode plates are spirally wound with a separator sandwiched therebetween by varying the positions thereof vertically from each other in a small extent, and the lead 15 is projected from the edges of the positive and negative electrode plates in the vertical direction thereof, as described previously in describing the conventional art with reference to FIG. 13. A metallic collection terminal comprising a metallic lath plate, a metallic net plate and the like is welded to the lead 15 projecting from the edges of the electrode plates, with the former placed on the latter.

Different from the method of collecting electric current generated in the electrode plate by installing collection terminals at one point thereof, the multipoint collection method allows electric current to be collected from a plurality of points of one electrode plate as described previously. Accordingly, the internal pressure of the battery can be reduced and thus, the battery has a favorable discharge characteristic.

Needless to say, a plurality of collection terminals can be spot-welded to the lead 15 at one point to utilize the multipoint collection method as one-point collection method.

Figure 3:
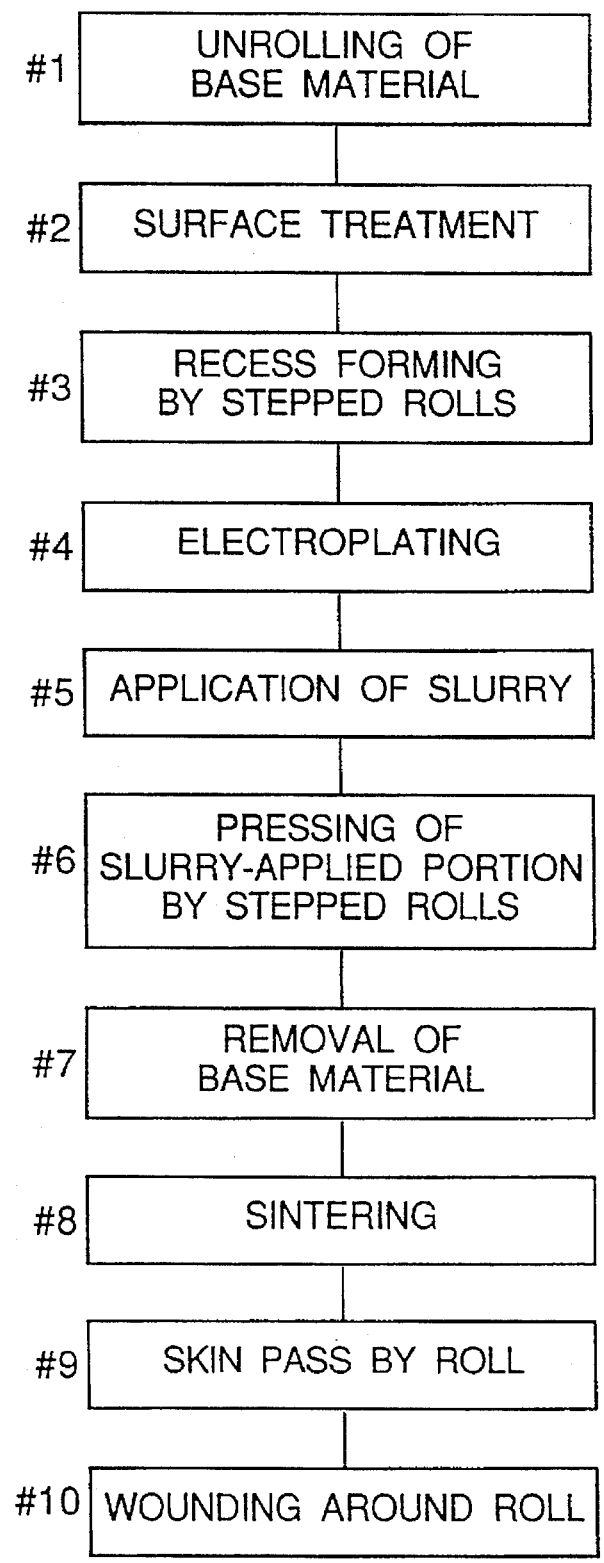
FIG. 3 is a flowchart showing a method for manufacturing a lead-provided porous metal sheet according to a first embodiment of the present invention.

The lead-provided porous metal sheet 11 according to the first embodiment is manufactured in accordance with a process shown by a flowchart shown in FIG. 3.

As a three-dimensional net-shape porous base material, a base material 30 comprising a foamed sheet ahd a mesh sheet layered on the foamed sheet is used. At step #1, the base material 30 is unrolled.

The foamed sheet made or,polyurethane sponge is 0.5–5.0 mm in its thickness. Favorably, the diameters of the pores range from 50 to 500 μm and more favorably, from 200 to 350 μm. Favorably, the diameters of fibers of the mesh sheet are 0.01–1.0 mm and 2-mesh–200-mesh, and more favorably, 0.05–0.1 mm and 40-mesh–120-mesh. Favorably, the porosity of the mesh sheet is 40–99%. The material of the mesh sheet is selected from synthetic resin such as polyester, nylon, acrylic, polypropylene, polyethylene or rayon; an organic substance including natural fiber such as cellulose or paper; and an inorganic substance such as metal, glass or carbon. The mesh sheet has a braided structure comprising braided warps and wefts. The fiber of the mesh-sheet is round, rectangular or flat.

At step #2, the surface of the base material 30 is treated to impart electrical conductivity thereto, then, a porous metal material is formed.

Figure 4:
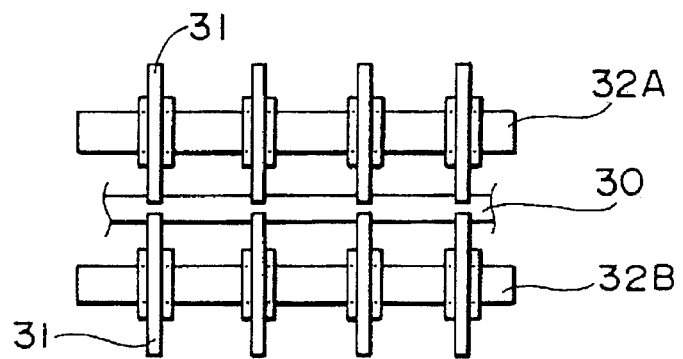
FIG. 4 is a front view showing a state in which grooves are formed by means of a pair of stepped rolls at step #3 of the flowchart shown in FIG. 3.

Then, at step #3, as shown in FIG. 4, the electroplated base material 30 (namely, the porous metal material 30) is passed between a pair of upper and lower stepped roils 32A and 32B each having a plurality of projections 31 formed on the surfaces of the rolls 32A and 32B. The projections 31 press the upper and lower surfaces of the electroplated base material 30 by spacing them at regular intervals on the surface thereof.

Figure 5:
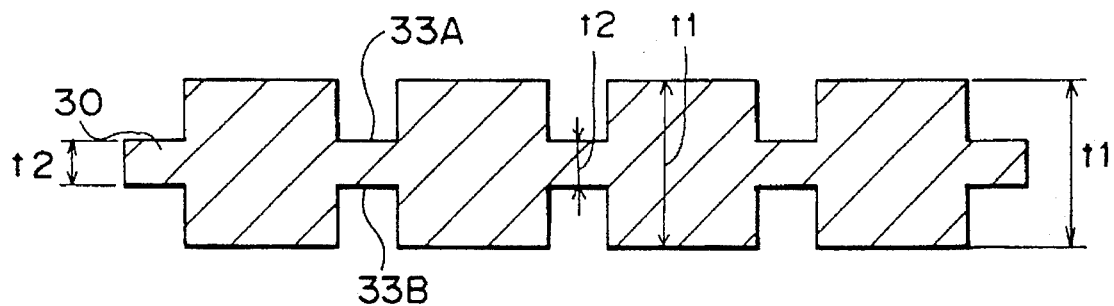
FIG. 5 is a sectional view showing a base material having the grooves formed by the process shown in FIG. 4.

The electroplated base material 30 is pressed by the projections 31 and consequently, recessed. That is, a plurality of a pair of recesses 33A and 33B is formed opposite to each other on the base material 30, as shown in FIG. 5.

Because the base material 30 is pressed by the projections 31, the thickness of the portion interposed between the recesses 33A and 33B is reduced from t1=0.2 mm–3.0 mm to t2=0.01 mm–0.25 mm.

As a result, the porosity of the bottom surface of the recesses 33A and 33B is reduced.

At step #4, the entire surface of the base material 30 is electroplated.

The base material 30 is electroplated by the method previously proposed by the present applicant and disclosed in Japanese Laid-Open Patent Publication No. 3-241662. That is, plating liquid is allowed to collide with the base material 30 in a plating bath in a direction substantially perpendicular to the base material 30, vacuum evaporation film forming method or electroless plating method.

In vacuum evaporation film forming method, the following metals are used to plate the base material 30: Cu, Ni, Zn, Sn, Pd, Pb, Co, Al, Mo, Ti, Fe, SUS304, SUS430, or 30Cr. In electroless plating method, Cu, Ni, Co, Pd, Sn, or Zn is used. In electroplating method, Cu, Ni, Pd, Sn, Zn, Pb, or Fe is used.

Figure 6:
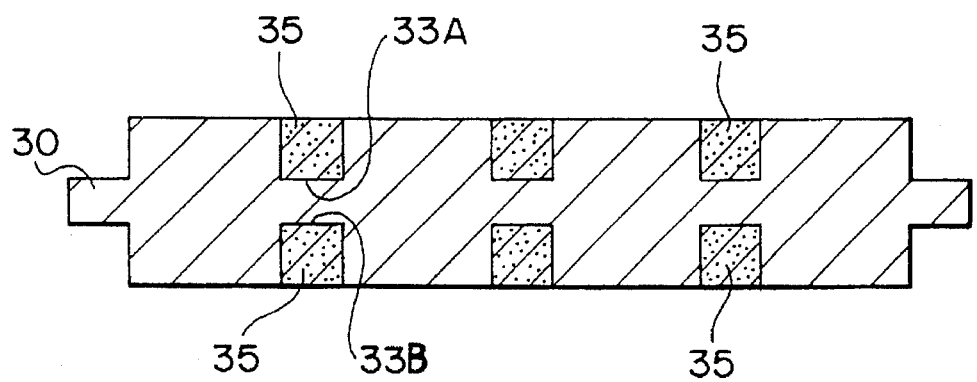
FIG. 6 is a sectional view showing a state in which fine metallic powders have been applied to the grooves shown in FIG. 5.

Then, at step #5, slurry 35 formed by mixing fine metallic powders and binder with each other is applied to the recesses 33A and 33B, as shown in FIG. 6.

Because the surface of the recesses 33A and 33B is electroplated at step #4, if the porosity of the recesses 33A and 33B is reduced to about 0% at step #4. Solid metal is formed thereon at step #5, whereas if the porosity thereof is reduced to less than 15% at step #3, the porosity is further reduced to 0% at step #4 and step #5.

Thus, the application of the slurry 35 to the grooves 33A and 33B allows the porosity thereof to be 0% and the solid metal to be completely formed thereon.

Instead of applying the slurry 35 to the recesses 33A and 33B, it is possible to apply binder thereto and spray fine metallic powders to the binder. The fine metallic powders adhere to the binder.

As the fine metal powders, one of flake-shaped metal powder, ultrafine metal powder having diameters of 0.02 μm–1.0 μm, and pulverized metal powder having diameters of 1.0 μm–6.0 μm or a mixture of two of the above three types of powders is used. The thickness of the flake-shaped metal powder is 0.02 μm–1.0 μm and the longer size of the surface thereof is 0.2 μm–10.0 μm. Preferably, the pulverized metal powders are used in combination with the flake-shaped metal powders or the ultrafine metal powders by mixing them with each other or layering them one on the other.

For example, if pulverized metal powders having large diameters and the ultrafine metal powders having small diameters are mixed with each other, the latter penetrates into gaps between the former. Consequently, the mixed metal powders can be attached to the base material 30 at a high density. In addition, it is possible to overlay the flake-shaped metal powders on the pulverized metal powders or the ultrafine metal powders.

The following metals are used as the metal powders: Ni, Cu, Al, Ag, Fe, Zn, Sn, or Fe—Cr alloy.

The slurry 35 formed by mixing the fine metal powders and the binder is applied to the recesses 33A and 33B by roll coating method, screen coating method, spray method or doctor coating method.

The method for attaching the fine metal powders to the electroplated base material 30 (namely porous metal material) is carried out by any one of the methods proposed by the present applicant and disclosed in Japanese Laid-Open Patent Publications No. 5-229283 and 5-229284, depending on purpose.

For example, the slurry 35 composed of the binder, the flake-shaped metal powders, and ultrafine metal powders is applied to the recesses 33A and 33B of the electroplated base material 30 in a predetermined thickness by using a screen coating apparatus shown in FIGS. 7 and 8.

Figure 7A:
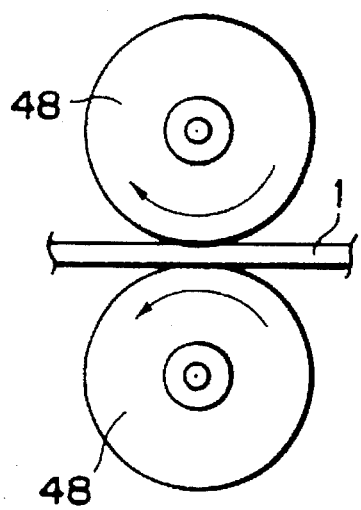
FIG. 7A is a schematic side view showing an apparatus for applying slurry containing fine metallic powders to a base material.
Figure 7B:
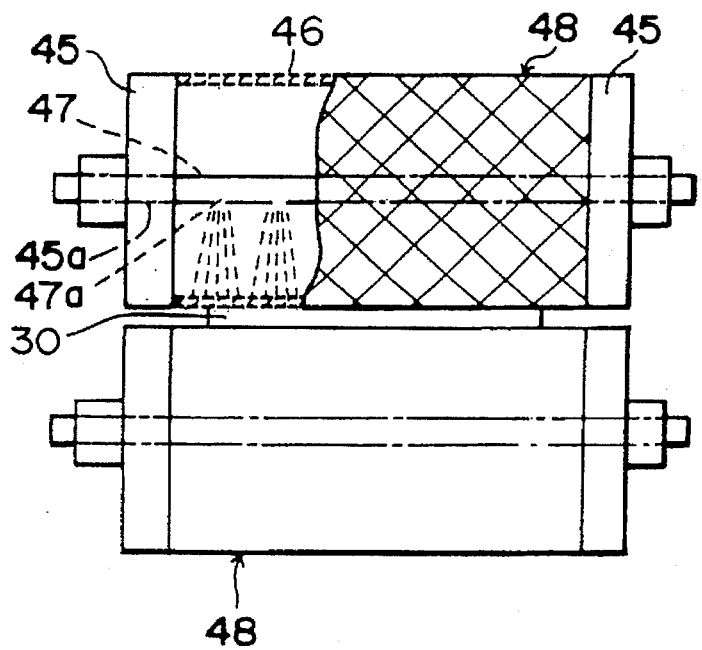
FIG. 7B is a schematic front view showing the apparatus for applying the slurry of fine metallic powders to the base material.

In the apparatus shown in FIGS. 7A and 7B, the slurry 35 is supplied into a pair of coating rolls 48 so as to apply the slurry 35 to the recesses 33A and 33B through a screen constituting the peripheral wall of each coating roll 48. In the apparatus, a cylindrical peripheral wall covered with a screen 46 made of a metal net is provided between side plates 45 disposed at both sides of each coating roll 48. A hole 45a is defined at the center of each side plate 45 so as to receive each end of a slurry supply pipe 47 extending axially through the center of the cylindrical screen 46. In a pair of the coating rolls 48, slurry jetting holes 47a are formed on the slurry supply pipe 47 at regular intervals. The coating rolls 48 are vertically disposed on both sides of the electroplated base material 30.

In the coating rolls 48, the slurry 35 is supplied to the slurry supply pipe 47 and jetted from the slurry jetting holes 47a to the recesses 33A and 33B of the electroplated base material 30 through the screen 46.

The screen 46 allows the slurry 35 to be jetted to the recesses 33A and 33B in a uniform thickness.

Figure 8A:
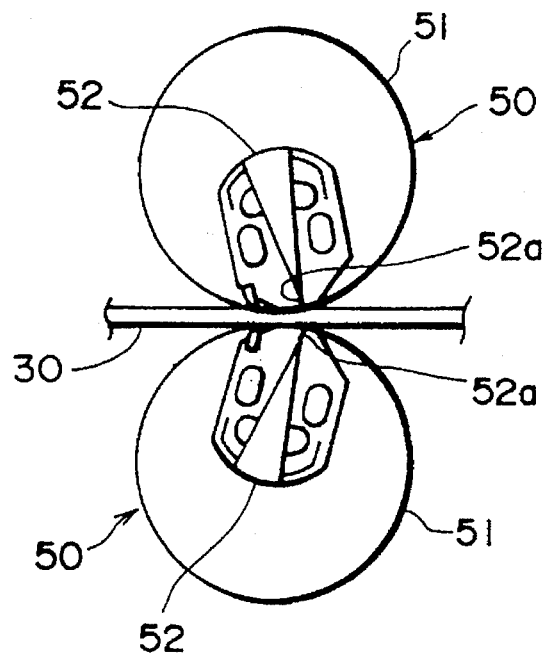
FIG. 8A is a schematic side view showing another apparatus for applying slurry of fine metallic powders to the base material.
Figure 8B:
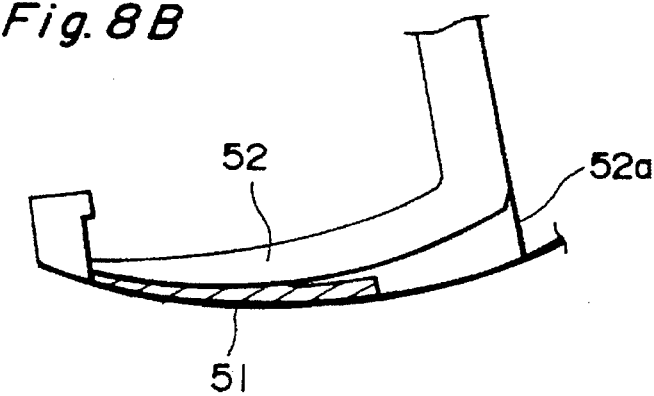
FIG. 8B is a partly enlarged view showing the apparatus for applying the slurry of fine metallic powders to the base material.

An apparatus shown in FIGS. 8A and 8B is also of rotary screen type. Similarly to the apparatus shown in FIG. 7, a pair of upper and lower coating rolls 50 is disposed on both sides of a transport path through which the electroplated base material 30 travels. Similarly to the coating rolls 48 shown in FIG. 7, the peripheral surface of each coating roll 50 is covered with a screen 51 made of a metal net. The foam-like slurry 35 is supplied to a squeeze 52 provided inside each coating roll 50 at a pressure of two to three atmospheres from a pipe (not shown) extending axially through the center of the coating rolls 50.

The squeeze 52 has a discharge opening 52a disposed on the side on which the squeeze 52 is brought into contact with the electroplated base material 30. When the slurry 35 is supplied from the discharge opening 52a to the recesses 33A and 33B through the screen 51, it contacts the atmospheric air. As a result, the foam-like slurry 35 bursts due to the difference between the pressure thereof and that of the atmospheric air, thus returning to paste-like slurry. When the foam-like slurry 35 bursts, it is supplied to the recesses 33A and 33B. Thus, a uniform thickness of slurry is formed on the recesses 33A and 33B.

As described above, the rotary screen method enables the slurry 35 to be applied to the recesses 33A and 33B in a predetermined thickness.

It is possible to use a pair of rolls having projections to apply the slurry 35 to the recesses 33A and 33B by inserting the slurry-applied projections thereinto. Further, it is possible to apply the binder to the bottom surface of the recesses 33A and 33B and spray fine metal powders over the binder.

Then, at step #6, the electroplated base material is passed between a pair of stepped rolls 32A and 32B having projections 31 formed thereon to press the projections 31 against the slurry-applied portion of the electroplated base material 30.

Dense fine metal powders can be provided because they are pressed by the projections 31. The metallic structure of the porous metal portion is averaged as compression rate increases, and thus the strength thereof is increased when they are sintered at step #8.

Then, at step #7, the electroplated base material 30 pressed at step #6 is passed through a heating apparatus to heat it at a predetermined temperature for a predetermined period of time to burn out or remove the resin of foamed sheet and the mesh sheet from metallic layer.

At step #8, the solid metal and the porous metal portion are sintered at a predetermined temperature for a predetermined period of time by passing it through the heating apparatus in which reducing atmosphere has been generated.

At step #9, the solid metal and the metal pore are passed between a pair of stepped rolls similar to those shown in FIG. 4 to roll them to a predetermined thickness.

At the last step #10, the lead-provided porous metal sheet 11 thus formed is wound around a roll.

As described above, the lead-provided porous metal sheet 11 shown in FIG. 1 is manufactured in the process comprising steps #1 through #10.

Figure 9A:
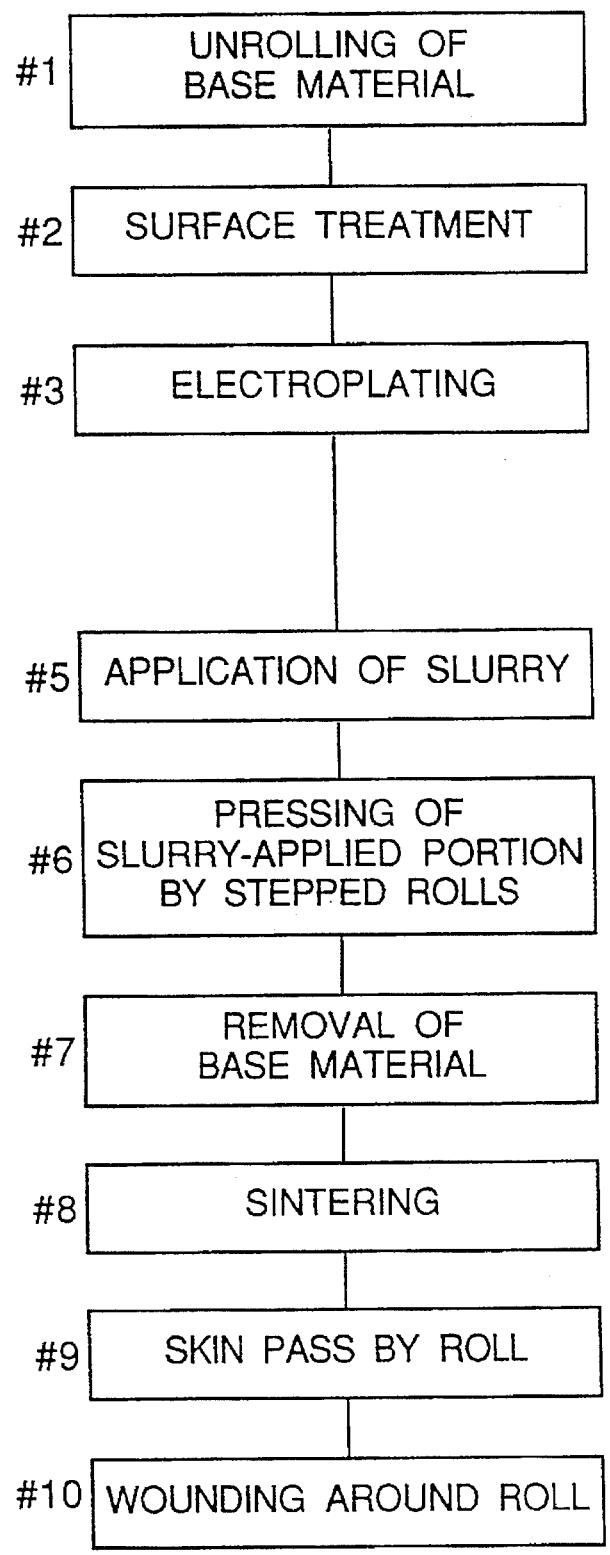
FIGS. 9A, 9B and 9C are block diagrams showing a process of manufacturing a lead-provided porous metal sheet according to second through fourth embodiments of the present invention.

The method for manufacturing the lead-provided porous metal sheet 11 according to the present invention is not limited to the above-described methods, but can be manufactured by processes of the second through the eighth embodiments shown by block diagrams of FIGS. 9(A)(B) (C) and 10 (A)–(D).

Figure 11:
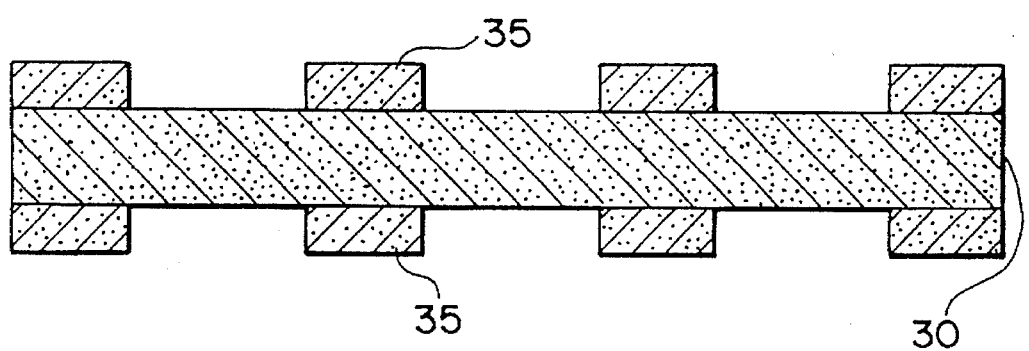
FIG. 11 is a schematic view showing a part of the process to be performed in the second embodiment.

In the second embodiment as shown in FIG. 9(A), after the surface of the base material is chemically plated at step #2, the entire surface of the base material is electroplated at step #3. Step #4 is not provided in the second embodiment. Then, slurry consisting of fine metal powders and binder is applied to the surface of the electroplated base material at step #5 to form leads thereon continuously in the lengthwise direction of the electroplated base material by applying the slurry at regular intervals, namely, in a stripe configuration in the widthwise direction thereof, as shown in FIG. 11.

Figure 9B:
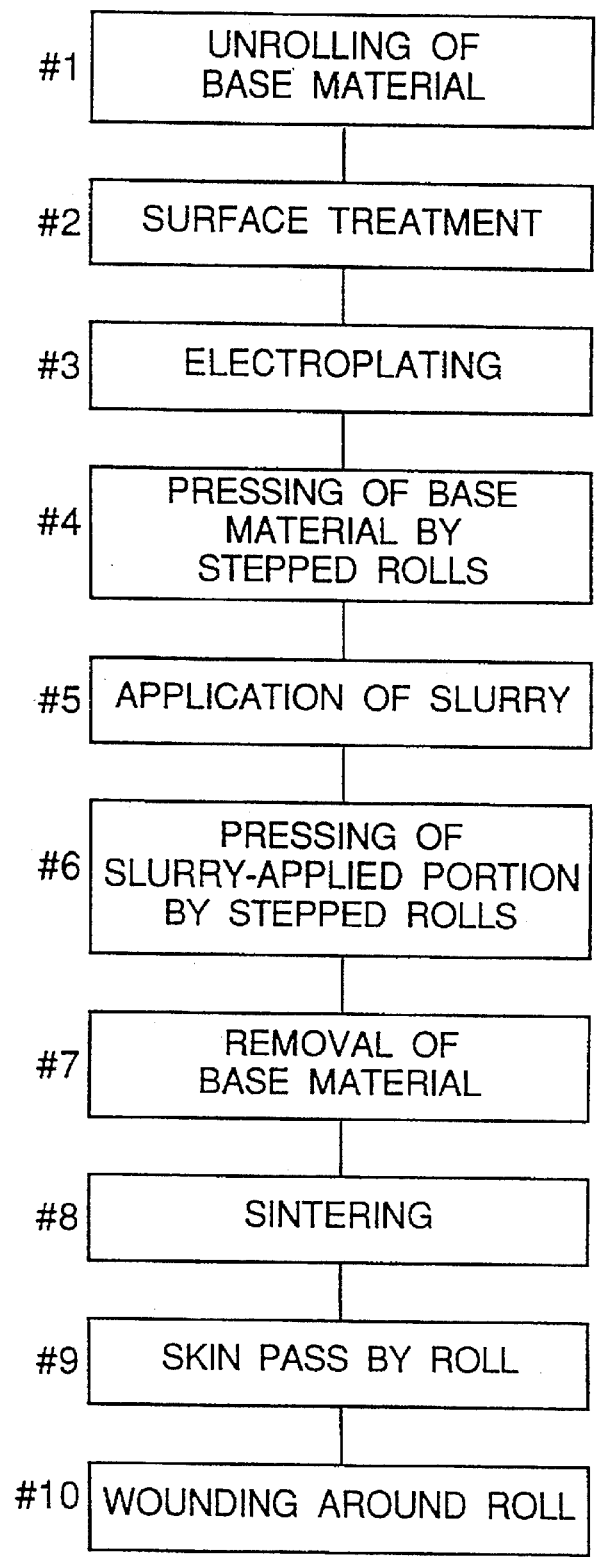

In the third embodiment as shown in FIG. 9(B), different from the first embodiment, the entire surface of the base material is electroplated at step #3, and then, recesses are formed by pressing the projections of the stepped rolls against the base material at step #4. Slurry is applied to the recesses at step #5. The operations to be performed at steps 5 through 10 are the same as those to be performed in the first embodiment.

Figure 9C:
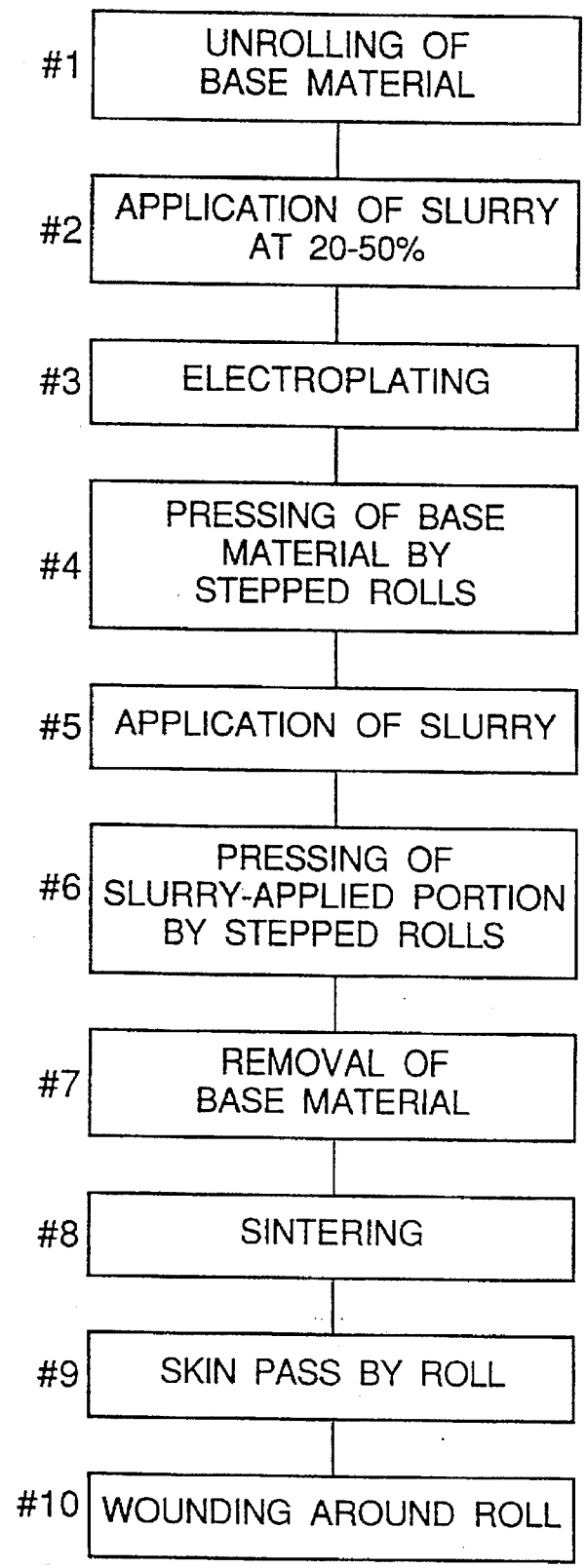

In the fourth embodiment as shown in FIG. 9(C), at step #2, the surface of the base material is not chemically plated, but slurry consisting of fine metal powders and binder is applied to the entire surface of the base material to form a conductive metal layer. The percentage of the amount of metal of the slurry to be applied to the base material in the fourth embodiment is 20% –50% of the total amount of metal to be attached thereto so as to reduce the amount of metal to be used in electroplating the conductive metal layer at step #3. The operations to be performed at steps 3 through 10 are the same as those to be performed in the second embodiment.

Figure 10A:
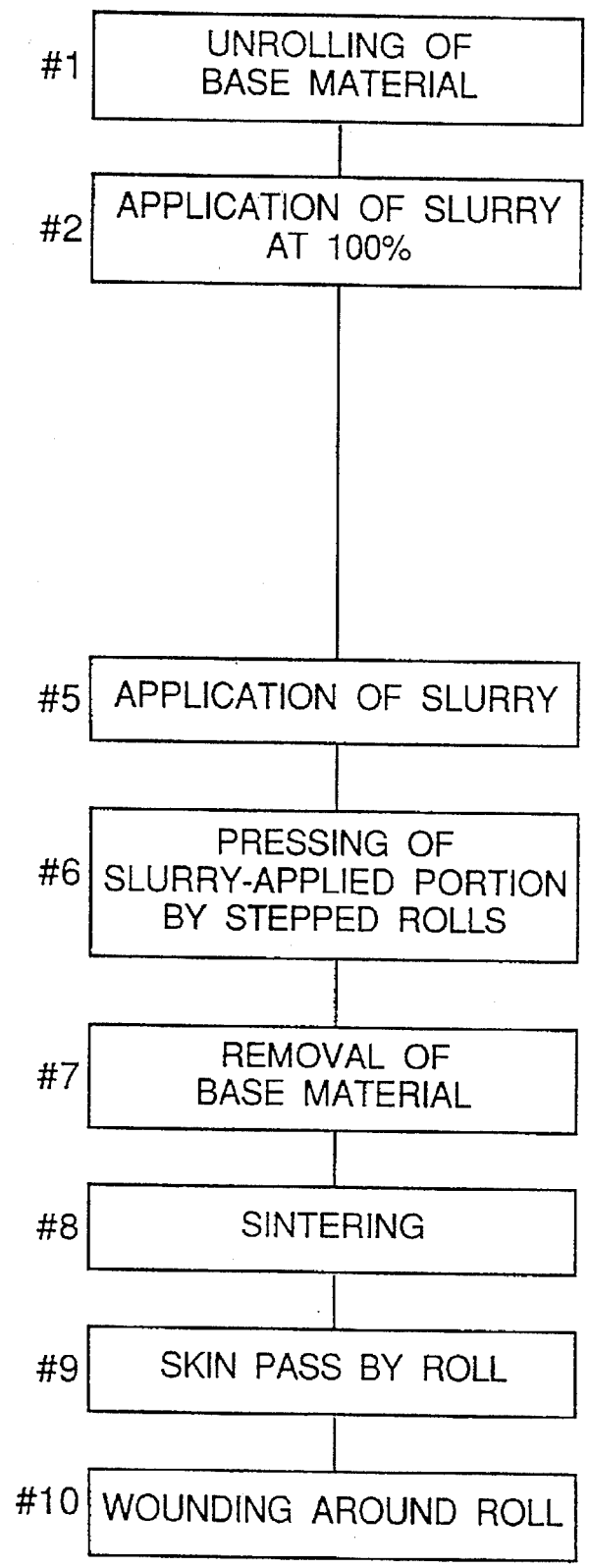
FIGS. 10A, 10B, 10C and 10D are block diagrams showing a process of manufacturing a lead-provided porous metal sheet according to fifth through eighth embodiments of the present invention.

In the fifth embodiment as shown in FIG. 10(A), at step #2, slurry consisting of fine metal powders and binder is applied to the surface of the base material. The percentage of the amount of metal of the slurry to be applied at step #2 to the base material in the fifth embodiment is 100% of the total amount of metal to be attached thereto. Steps 3 and 4 are not provided in the fifth embodiment. Slurry consisting of fine metal powders and binder is applied to the surface of the base material covered with metallic slurry (namely, the porous metal material) at step #5 to form leads thereon continuously in the lengthwise direction of the base material by applying the slurry at regular intervals, namely, in a stripe configuration in the widthwise direction thereof. The operations to be performed at steps 5 through 10 are the same as those to be performed in the second embodiment.

Figure 10B:
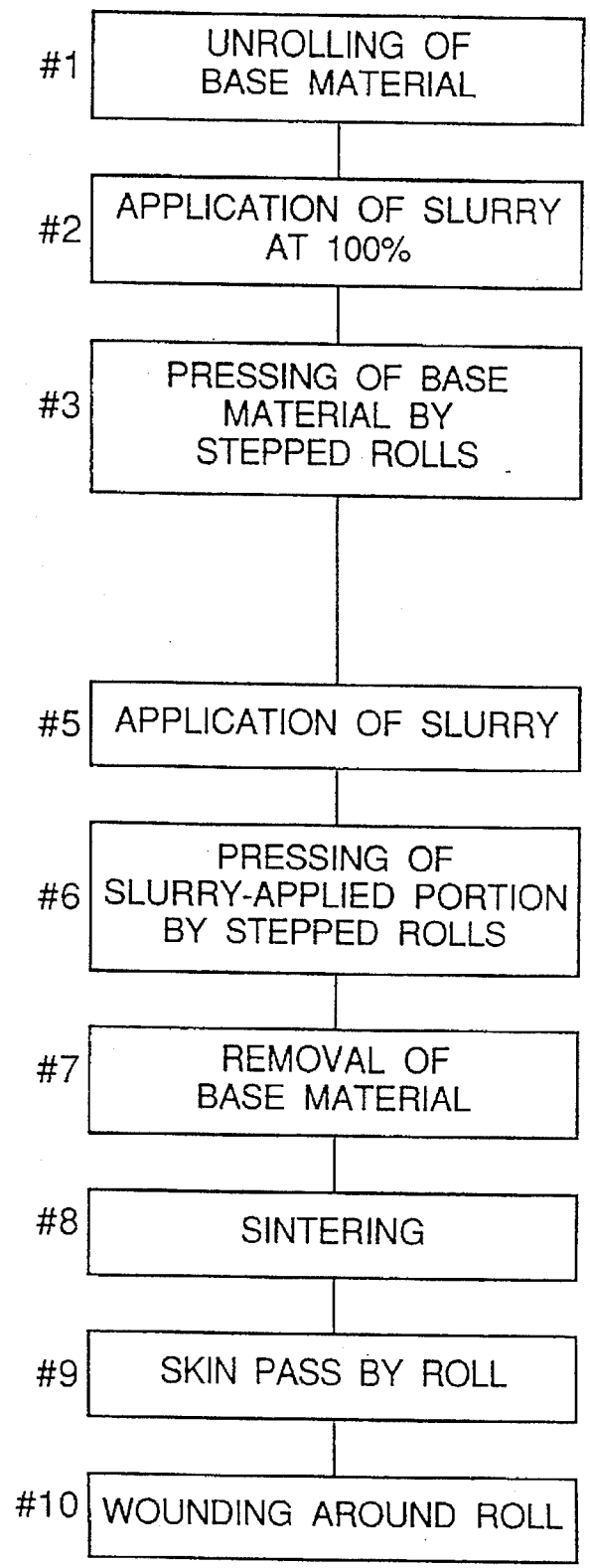

Similarly to the fifth embodiment, in the sixth embodiment as shown in FIG. 10(B), at step #2, slurry consisting of fine metal powders and binder is applied to the surface of the base material. The percentage of the amount of metal of the slurry to be applied to the base material in the sixth embodiment is 100% of the total amount of metal to be attached thereto. Then, at step #3, recesses are formed by pressing the projections of the stepped rolls against the base material covered with slurry at step #3. Step #4 is not provided in the sixth embodiment. Slurry is applied to the recesses at step #5. The operations to be performed at steps 5 through 10 are the same as those to be performed in the first embodiment.

Figure 10C:
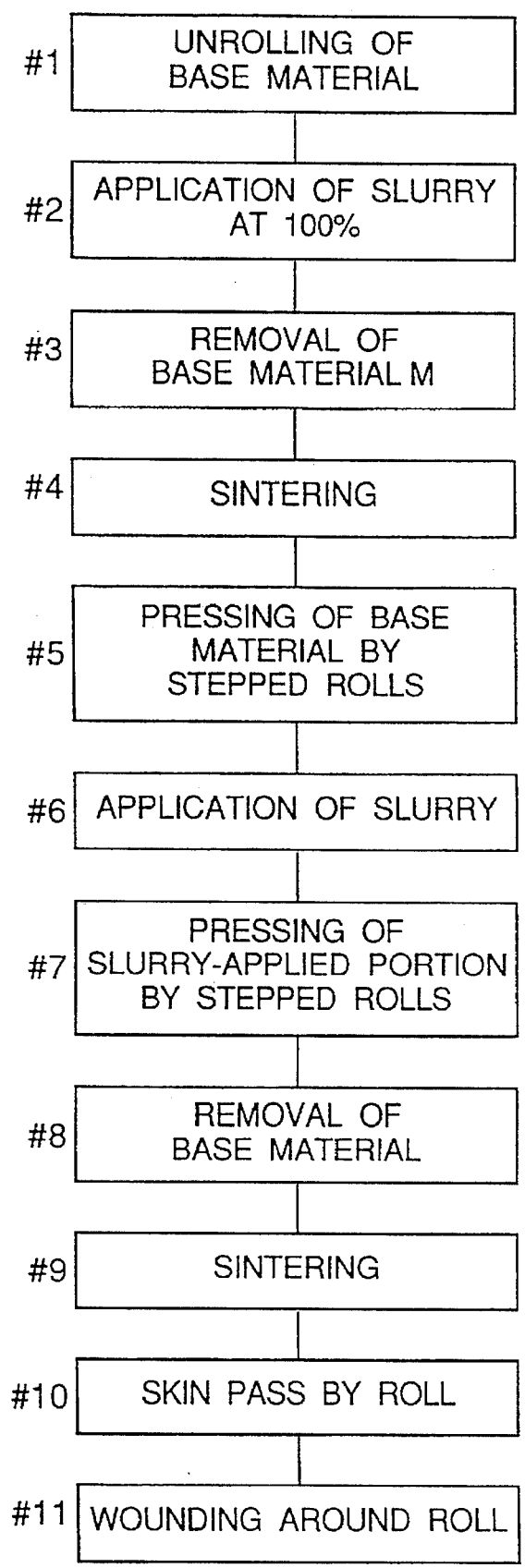

Similarly to the sixth embodiment, in the seventh embodiment as shown in FIG. 10(C), at step #2, slurry consisting of fine metal powders and binder is applied to the surface of the base material. The percentage of the amount of metal of the slurry to be applied to the base material in the seventh embodiment is 100% of the total amount of metal to be attached thereto. Then, at step #3 the base material covered with slurry is heated to burn out or remove the resin of foamed sheet and the mesh sheet composing the base material and the binder. Then, at step #4, the solid metal and the porous metal portion are sintered. At step #5, recesses are formed by pressing the projections of the stepped rolls against the metal porous sheet at step #5. At step #6, slurry is applied to the recesses. The operations to be performed at steps 7 through 11 are the same as those to be performed in the second embodiment.

Figure 10D:
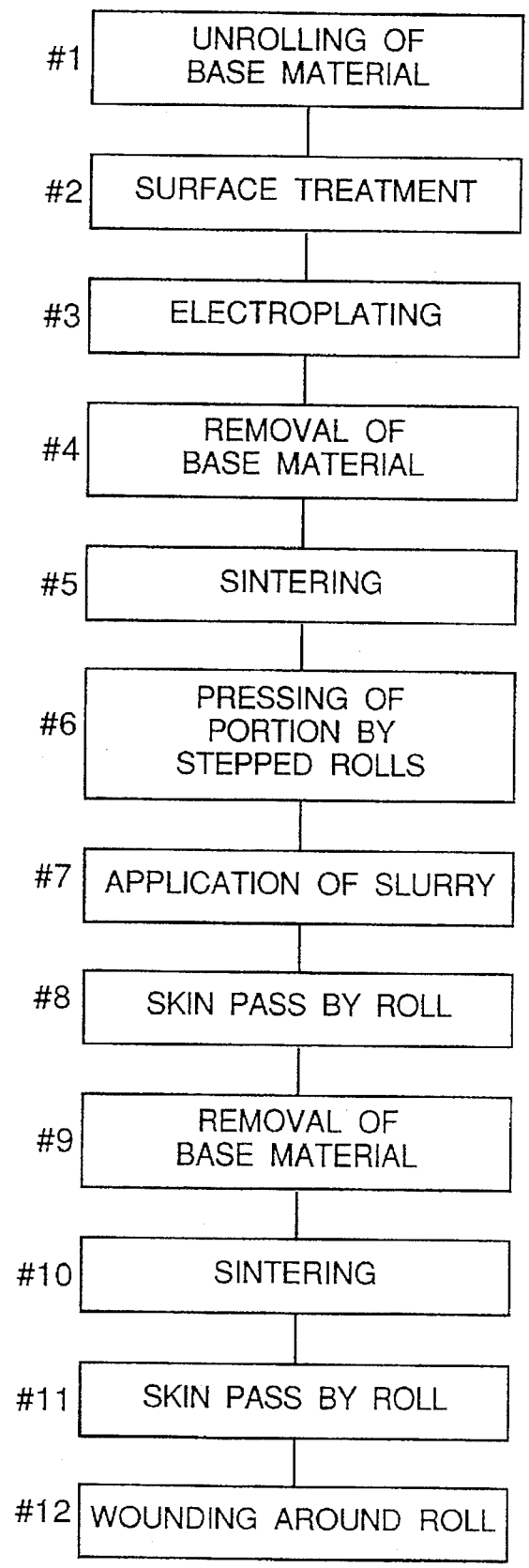

In the eighth embodiment as shown in FIG. 10(D), the operations to be performed at steps #1 through #3 are the same as those to be performed in the second embodiment. The operations to be performed at steps #4 through #12 are the same as those to be performed at steps #3 through #11 in the seventh embodiment.

As described above, in the seventh and eighth embodiments, metal is deposited on the entire surface of the base material and then, the base material is heated to burn out or remove the resin of foamed sheet and the mesh sheet composing the base material and the binder, thereby the porous metal sheet is formed. Then, recesses are formed on the porous metal sheet by pressing the projections of the stepped rolls against the base material. Then, slurry is applied to the recesses to form leads on the porous metal sheet.

Figure 12:
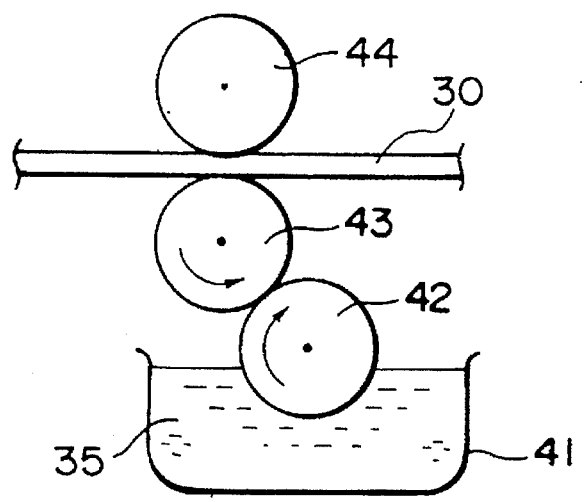
FIG. 12 is a schematic view showing an apparatus for applying slurry containing fine metallic powders to an entire base material.

In the fourth through seventh embodiments, it is preferable to use roll coating method shown in FIG. 12 in forming the porous metal sheet by applying slurry to the base material.

In an apparatus adopting roll coating method, a pick-up roll 42 is disposed in a liquid bath 41 reserving slurry 35, with a lower portion of the pick-up roll 42 immersed in the slurry 35, and a coating roll 43 is disposed above the pick-up roll 42. A service roll 44 is positioned above the coating roll 43, with the base material 30 sandwiched therebetween.

In the apparatus, the slurry 35 is transferred to the coating roll 43 through the pick-up roll 42. Then, the slurry 35 is applied to the base material 30, with the base material 30 pressed against the coating roll 43 and the service roll 44.

The gap between the coating roll 43 and the service roll 44 is adjusted to adjust the application amount of the slurry to the base material 30. In the fourth through seventh embodiments, the gap is adjusted to approximately ⅓ of the thickness of the base material 30 to impregnate the base material 30 with the slurry 35.

In the above apparatus, the amount of the slurry 35 to be applied to the lower surface of the base material 30 is greater than that to be applied to the upper surface thereof because the lower surface contacts the coating roll 43 and the upper surface contacts the service roll 44. In order to apply the slurry 35 to the upper and lower surfaces equally, it is preferable to turn the base material 30 upside down after the slurry 35 is applied to the lower surface.

In the first embodiment, the base material comprises the foamed sheet and the mesh sheet overlaid thereon, but it is possible to use a material comprising nonwoven cloth and a mesh sheet layered one on the other or a material comprising two mesh sheets and the nonwoven cloth sandwiched therebetween. It is also possible to use only the mesh sheet, the nonwoven cloth or the foamed sheet.

Favorably, the nonwoven cloth is 0.5–5.0 mm in its thickness. Favorably, the diameters of fibers of the nonwoven cloth are 0.05–1.0 mm and more favorably, 0.05–0.1 mm. Favorably, the porosity of the nonwoven cloth is 40–99%. Similarly to the mesh sheet, the material of the nonwoven cloth is selected from synthetic resin such as polyester, nylon, acrylic, polypropylene, polyethylene or rayon; organic substances such as cellulose, paper and natural fiber; and inorganic substances such as metal, glass or carbon.

As apparent from the foregoing description, according to the manufacturing method of the present invention, the stepped rolls having projections formed thereon are used to form recesses on the porous metal sheet. The recesses thus formed are unporous or have pores at a very small percentage. Slurry comprising fine metal powders is applied to the recesses. In another method for forming leads according to the present invention, after fine metal powders are applied to the porous metal sheet, they are compressed by the projections of the stepped rolls. In this manner, leads made of unporous solid metal can be easily formed.

As such, the present invention eliminates the need for the preparation of the lead-forming sheet required in the conventional method. Thus, the lead-provided porous metal sheet can be manufactured at a low cost and in a short period of time.

The position of the lead and the width thereof can be altered by only changing the positions of the recesses to be formed on the porous metal sheet by the projections of the stepped rolls and the positions to which fine metal powders are applied, depending on the type of a battery.

As described above, the lead made of continuous solid metal can be formed easily on the porous metal sheet formed by plating a foamed sheet, nonwoven cloth or a mesh sheet or a combination of at least two of the foamed sheet, the nonwoven cloth or the mesh sheet layered one on the other. These sheets are allowed to have porosity at more than 95%. Further, the lead can be formed in a predetermined position and width. Therefore, batteries having the lead-provided porous metal sheet used as the electrode plates thereof are uniform in performance and further, highly efficient and provide a high-speed charge and discharge. Hence the batteries can be reliably used. In addition, the lead-provided porous metal sheet is wide and can be successively manufactured, and thus, they are inexpensive. Furthermore, because the lead-provided porous metal sheet is coiled around a roll, it can be transported and stored easily and utilized widely.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a lead-provided porous metal sheet comprises the steps of:

plating a porous base material having a metal layer formed on a surface of a framework of the porous base material, passing the porous metal material through a roll having a projection to compress the porous metal material against the projection and reduce or eliminate pores so as to form at least a recess; and forming solid metal portions by applying fine metal powders to the recess;

whereby at least one lead made of the solid metal is formed thereon continuously in a predetermined width on the porous metal material, and wherein said porous base material comprises one of a single base material and a plurality of porous base materials layered one on each other.

2. The method of manufacturing a lead-provided porous metal sheet as defined in claim 1, the fine metal powder applied into the recess is compressed by a projection of a roll.

3. The method of manufacturing a lead-provided porous metal sheet as defined in claim 2, wherein the porous base material is baked out and sintered, after the fine metal powder applied into the recess is compresses by the projection of the roll.

4. The method of manufacturing a lead-provided porous metal sheet as defined in claim 1, wherein the fine metal powders to be applied so as to form as the lead are mixed with binder to form slurry, and the slurry is applied to the surface of the porous metal material in a stripe configuration with a predetermined width by rotary screen method, roll coating method, and doctor coating method.

5. The method of manufacturing a lead-provided porous metal sheet as defined in claim 1, wherein a pair of rolls having a projection respectively are provided at an upper and a lower surface of the porous metal material, these projections compress the upper and lower surface oppositely as to form the recess and compress the fine metal powders applied into the recess, whereby the solid metal portions are formed continuously on the upper and lower surfaces of the porous metal material.

6. The method of manufacturing a lead-provided porous metal sheet as defined in claim 1, wherein the porous base material is selected from a group consisting of formed sheet, nonwoven sheet and mesh sheet.

7. The method of manufacturing a lead-provided porous metal sheet as defined in claim 1, wherein the porous metal sheet is slit along each lead in a lengthwise direction thereof, and cut to predetermined lengths in directions perpendicular to the lengthwise directions, whereby a plurality of cut porous metal sheet having the lead disposed on at least one edge in the widthwise direction thereof are obtained.

8. A method of manufacturing a lead-provided porous metal sheet comprises the steps of:

applying fine metal powders to a porous base material having a metal layer formed on a surface of a framework of the porous base material, passing the porous metal material through a roll having a projection to compress the porous metal material against the projection and reduce or eliminate pores so as to form at least a recess; and forming solid metal portions by applying fine metal powders to the recesses;

whereby at least one lead made of the solid metal is formed thereon continuously in a predetermined width on the porous metal material, and wherein said porous base material comprises one of a single base material and a plurality of porous base materials layered one on each other.

9. The method of manufacturing a lead-provided porous metal sheet as defined in claim 8, the fine metal powder applied into the recess is compressed by a projection of a roll.

10. The method of manufacturing a lead-provided porous metal sheet as defined in claim 9, wherein the porous base material is baked out and sintered, after the fine metal powder applied into the recess is compressed by the projection of the roll.

11. The method of manufacturing a lead-provided porous metal sheet as defined in claim 8, wherein the fine metal powders to be applied so as to form as the lead are mixed with binder to form slurry, and the slurry is applied to the surface of the porous metal material in a stripe configuration with a predetermined width by rotary screen method, roll coating method, and doctor coating method.

12. The method of manufacturing a lead-provided porous metal sheet as defined in claim 8, wherein a pair of rolls having a projection respectively are provided at an upper and a lower surface of the porous metal material, these projections compress the upper and lower surface oppositely as to form recess and compress the fine metal powders applied into the recess, whereby the solid metal portions are formed continuously on the upper and lower surfaces of the porous metal material.

13. The method of manufacturing a lead-provided porous metal sheet as defined in claim 8, wherein the porous base material is selected a group consisting or formed sheet, nonwoven sheet and mesh sheet.

14. The method of manufacturing a lead-provided porous metal sheet as defined in claim 8, wherein the porous metal sheet is slit along each lead in a lengthwise direction thereof, and cut to predetermined lengths in directions perpendicular to the lengthwise directions, whereby a plurality of cut porous metal sheet having the lead disposed at least one edge in the widthwise direction thereof are obtained.

15. A method of manufacturing a lead-provided porous metal material comprises the steps of: plating one porous base material having a metal layer formed on a surface of a framework of the porous base material, applying fine metal powders linearly continuously in a stripe configuration to the porous metal material, passing the porous metal material through a roll having a projection to compress the entire fine powders applied thereto in a stripe configuration to form solid metal portions, whereby at least one lead made of the solid metal is formed thereon continuously in a predetermined width on the porous metal material, and wherein said porous base material comprises one of a single base material and a plurality of porous base materials layered one on each other.

16. The method of manufacturing a lead-provided porous metal sheet as defined in claim 15, wherein the porous base material is baked out and sintered, after the fine metal powder applied into the recess is compressed by the projection of the roll.

17. The method of manufacturing a lead-provided porous metal sheet as defined in claim 16, wherein a pair of rolls having a projection respectively are provided at an upper and a lower surface of the porous metal material, these projections compress the upper and lower surface oppositely as to form recess and compress the fine metal powders applied into the recess, whereby the solid metal portions are formed continuously on the upper and lower surfaces of the porous metal material.

18. The method of manufacturing a lead-provided porous metal sheet as defined in claim 15, wherein the fine metal powders to be applied so as to form as the lead are mixed with binder to form slurry, and the slurry is applied to the surface of the porous metal material in a stripe configuration with a predetermined width by rotary screen method, roll coating method, and doctor coating method.

19. The method of manufacturing a lead-provided porous metal sheet as defined in claim 15, wherein a pair of rolls having a projection respectively are provided at an upper and a lower surface of the porous metal material, these projections compress the upper and lower surface oppositely as to form recess and compress the fine metal powders applied into the recess, whereby the solid metal portions are formed continuously on the upper and lower surfaces of the porous metal material.

20. The method of manufacturing a lead-provided porous metal sheet as defined in claim 15, wherein the porous base material is selected a group consisting of formed sheet, nonwoven sheet and mesh sheet.

21. The method of manufacturing a lead-provided porous metal sheet as defined in claim 15, wherein the porous metal sheet is slit along each lead in a lengthwise direction thereof, and cut to predetermined lengths in directions perpendicular to the lengthwise directions, whereby a plurality of cut porous metal sheet having the lead disposed at least one edge in the widthwise direction thereof are obtained.

22. A method of manufacturing a lead-provided porous metal material comprises the steps of:

applying fine metal powders to a porous base material having a metal layer formed on a surface of a framework of the porous base material, applying fine metal powders linearly continuously in a stripe configuration to the porous metal material, passing the porous metal material through a roll having a projection to compress the entire fine metal powders applied thereto in a stripe configuration to form solid metal portions, whereby at least one lead made of the solid metal is formed thereon continuously in a predetermined width on the porous metal material, and wherein said porous base material comprises one of a single base material and a plurality of porous base materials layered one on each other.

23. The method of manufacturing a lead-provided porous metal sheet as defined in claim 22, wherein the porous base material is baked out and sintered, after the fine metal powder applied into the recess is compressed by the projection of the roll.

24. The method of manufacturing a lead-provided porous metal sheet as defined in claim 23, wherein a pair of rolls having a projection respectively are provided at an upper and a lower surface of the porous metal material, these projections compress the upper and lower surface oppositely as to form recess and compress the fine metal powders applied into the recess, whereby the solid metal portions are formed continuously on the upper and lower surfaces of the porous metal material.

25. The method of manufacturing a lead-provided porous metal sheet as defined in claim 22, wherein the fine metal powders to be applied so as to form as the lead are mixed with binder to form slurry, and the slurry is applied to the surface of the porous metal material in a stripe configuration with a predetermined with by rotary screen method, roll coating method, and doctor coating method.

26. The method of manufacturing a lead-provided porous metal sheet as defined in claim 22, wherein a pair of rolls having a projection respectively are provided at an upper and a lower surface of the porous metal material, these projections compress the upper and lower surface oppositely as to form recess and compress the fine metal powders applied into the recess, whereby the solid metal portions are formed continuously on the upper and lower surfaces of the porous metal material.

27. The method of manufacturing a lead-provided porous metal sheet as defined in claim 22, wherein the porous base material is selected a group consisting of formed sheet, nonwoven sheet and mesh sheet.

28. The method of manufacturing a lead-provided porous metal sheet as defined in claim 22, wherein the porous metal sheet is slit along each lead in a lengthwise direction thereof, and cut to predetermined lengths in directions perpendicular to the lengthwise directions, whereby a plurality of cut porous metal sheet having the lead disposed at least one edge in the widthwise direction thereof are obtained.

* * * * *